Figure 1:
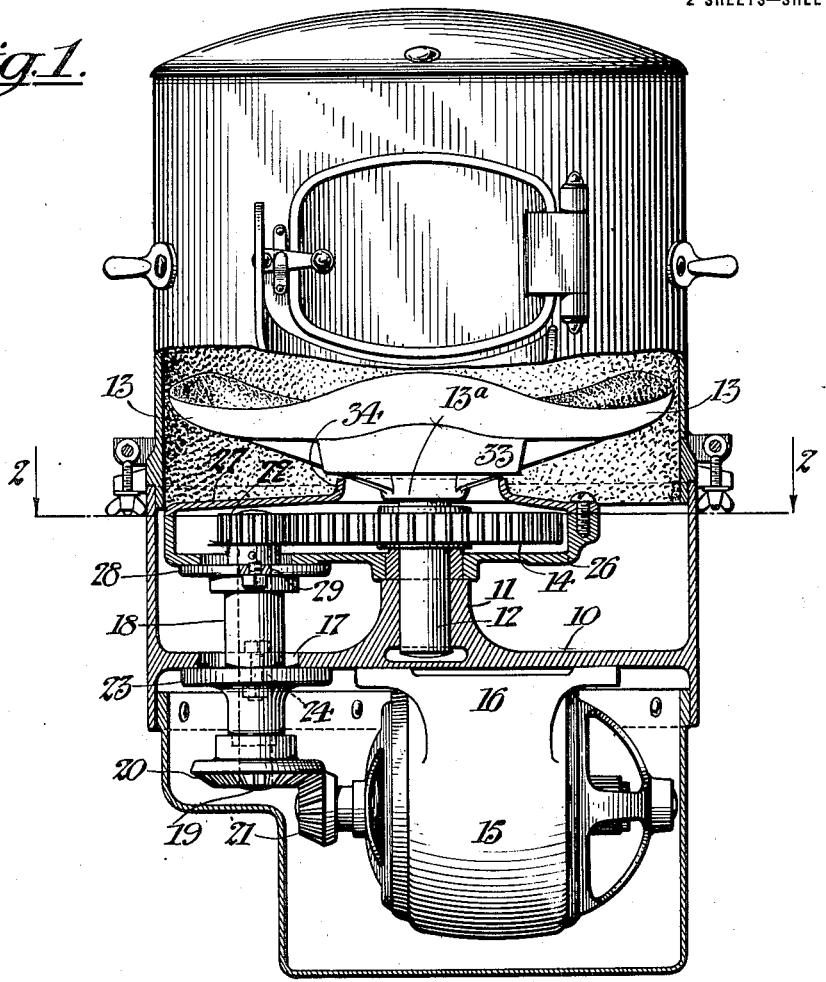

H. ROBINSON.
VEGETABLE PARING MACHINE.
APPLICATION FILED JAN. 2, 1915.

1,174,612.

Patented Mar. 7, 1916.
2 SHEETS—SHEET 1.

Witnesses:—
Titus K. Irons.
Ann M. Murray

Inventor:—
Henry Robinson
by his Attorney.
C. W. Fairbank

H. ROBINSON.
VEGETABLE PARING MACHINE.
APPLICATION FILED JAN. 2, 1915.

1,174,612.

Patented Mar. 7, 1916.
2 SHEETS—SHEET 2.

Witnesses:

Inventor:
Henry Robinson,
by his Attorney.

UNITED STATES PATENT OFFICE.

HENRY ROBINSON, OF SOUTH ORANGE, NEW JERSEY.

VEGETABLE-PARING MACHINE.

1,174,612.

Specification of Letters Patent.

Patented Mar. 7, 1916.

Application filed January 2, 1915. Serial No. 28.

*To all whom it may concern:*

Be it known that I, HENRY ROBINSON, a citizen of the United States, and resident of South Orange, in the county of Essex and State of New Jersey, have invented certain new and useful Improvements in Vegetable-Paring Machines, of which the following is a specification.

This invention relates to certain improvements in vegetable paring machines of that type in which a quantity of vegetables, while supported in a container, are pared by the abrasive action during the rapid rotation of the supporting member, such for instance as the bottom of the container. In machines of this type the peeling is ordinarily done both by the revolving bottom plate and by the abrasive lining on the inner surface of the container. Centrifugal force is imparted to the vegetables by the rotation of the bottom plate and this causes the vegetables to move outwardly along the surface of the bottom plate to the periphery and against the inner side of the container. In order to prevent them from being ground away while in one position, it is necessary to have an additional device to continually remove the vegetables from the outer periphery of the bottom plate and the inner surface of the container by throwing the vegetables back toward the center. By means of my invention, I simplify and cheapen the cost of manufacture as well as the cost of upkeep and render the machine better adapted for use under ordinary commercial conditions.

The shape and contour of the upper surface of the abrading member is a matter of great importance as the member not only supports the vegetables, but by reason of its rotation, it causes continuous circulation of the vegetables and a removal of the outer coating or paring. I so design and shape the upper surface of the member as to secure a uniform circulation of the vegetables and avoid such sudden changes in the direction of movement of the vegetables as might bruise, mutilate or crush them. The body portion of the member on its upper surface presents a series of rounded ridges or raised portions separated by rounded depressions, all merging to form a continuous undulating surface between the center portion and the peripheral portion. The curvature is such as to conform best to the rounded surface of the vegetables and to give the maximum contact with the abrading surface and prevent irregular and uneven and wasteful peeling action. The elements to this surface along the major portion of its length are all preferably substantially straight and preferably no two successive elements are in exactly the same plane although for comparatively narrow portions they may lie in the same plane and they may be slightly curved. Preferably they extend radially although they may be tangential to the hub portion or at any desired angle. Preferably, the elevations rise from a substantially horizontal plane defined by the portions midway between the elevations, but if desired, the reverse formation may be employed, that is, with depressions below a horizontal plane defined by the portions midway between depressions. These elevations and depressions may extend all of the way from the center to the periphery or only part way from either, or between the two, and they may be evenly or irregularly spaced and successive ones of different elevation or depression. At the peripheral portion there is an upturned lip or flange, the upper edge of which is also wavy, while the lower edge merges into the body portion. This, together with the inclination of the sides of the raised portions, act as a scoop to throw the vegetables upwardly and cause them to return to the center. Thus the vegetables that are on the top drop to the bottom to fill up the vacancy made by the removal of the vegetables. A continuous and uniform circulation of the vegetables is thus secured and this results in a uniform peeling.

In the accompanying drawings, to which reference is to be had and in which similar reference characters indicate corresponding parts in the several views, I have illustrated one embodiment of my invention, although I desire it to be particularly understood that various changes may be made in the details of construction and in the arrangement of the parts without departing from the spirit of my invention. Such changes will readily suggest themselves to those skilled in the art and are to be considered as falling within the scope of my invention as defined in the appended claims.

Figure 2:
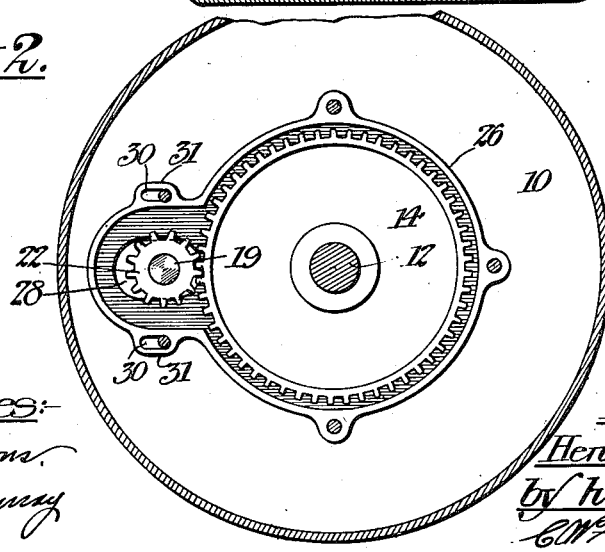
Figure 3:
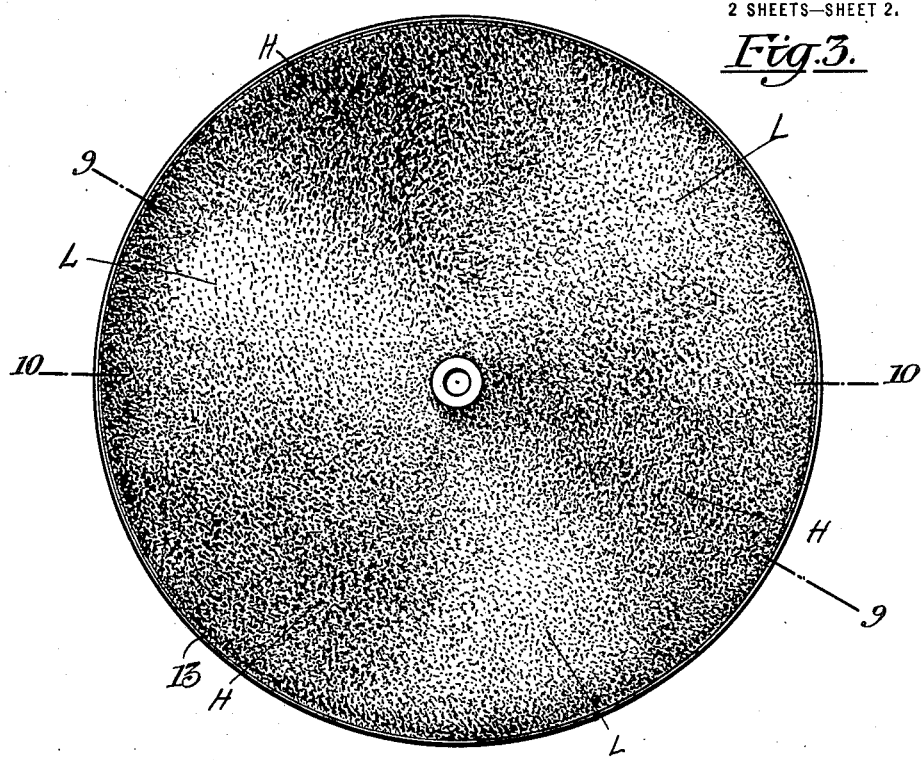
Figure 4:
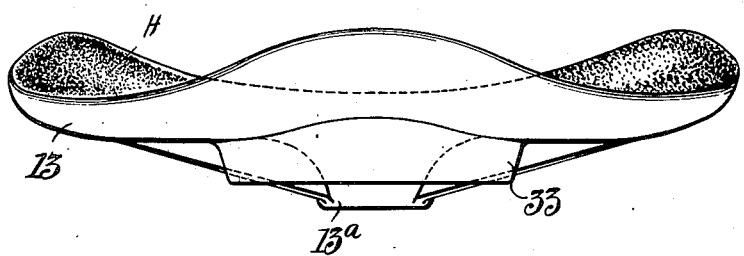
Figure 5:
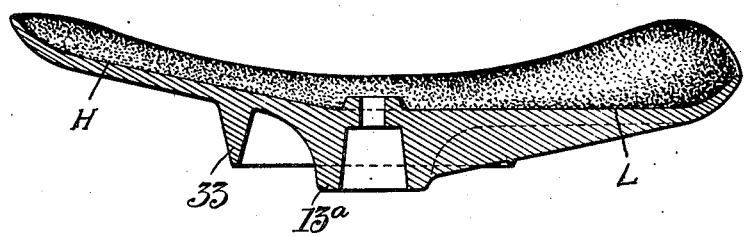
Figure 6:
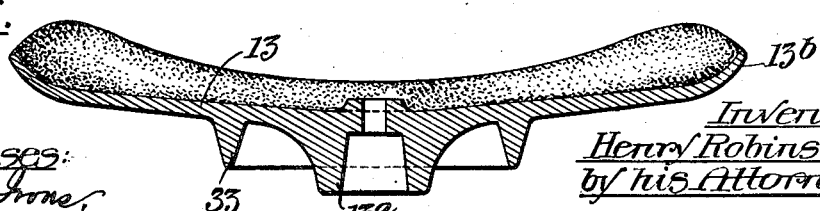

In these drawings, Figure 1 is a side elevation of a portion of a machine embodying my invention, the lower part being shown in section; Fig. 2 is a transverse section on the line 2—2 of Fig. 1; Fig. 3 is a plan view of the rotary abradant member; Fig. 4 is a side elevation thereof; and Figs. 5 and 6 are transverse sections on the lines 9—9 and 10—10, respectively, of Fig. 3.

I have illustrated my invention as applied to a machine of the general character illustrated in my previous Patent No. 942,932, issued December 14, 1909, although I do not wish to be in any way limited to this type of machine except as set forth in the claims.

In the specific form of machine illustrated, there is included a frame member 10 constituting a pan and supported in any suitable manner, preferably by legs, not shown. This pan, at the center, has a boss or hub portion 11 within which is mounted a shaft 12 carrying at its upper end a revoluble abrading member 13 which serves to remove the outer layer or peeling from the vegetables within the container above. The rotary abradant member 13 is preferably formed of a single piece of cast metal and has a hub 13ª at the center adapted to receive and be secured to the upper end of the shaft. The body portion of the upper surface, that is, the major portion between the center portion and the peripheral portion, is formed of successive and alternate, radially extending, diverging elevations and depressions so as to form a continuous wavy surface. In the specific form shown, this surface has three elevations H, H, H, and three depressions L, L, L. The radial elements of the surface are all substantially straight from the center portion out to a point adjacent to the periphery and the comparatively gentle curvature is such that the high points are not very much above the low points, but they all merge into each other to form a continuous wavy surface. In other words, no two adjacent radial elements of the surface extend upwardly from the horizontal to the same extent although there may be, if desired, comparatively flat portions along the tops of the elevations and the bottoms of the depressions. Preferably, the radial element of the surface at the bottom of each depression is substantially horizontal while the radial element at the top of an elevation extends upwardly at somewhere near ten degrees (10°) to the horizontal. The portion 13ᵇ curves upwardly to form a continuous lip or flange, the periphery of which lies in a wavy circle, all portions of which are at equal distances from the axis of rotation. This edge comes adjacent to the stationary peripheral wall of the chamber and is at a comparatively shallow angle thereto.

The upper surface of the member constitutes the abradant surface and this surface may be formed in any suitable manner as, for instance, by the fusing of carborundum thereon. When the member is rotated at the necessary speed, the action of centrifugal force will cause a radial movement of the vegetables toward the periphery and the radial and relative circumferential movement of the vegetables over the abradant surface will effect the peeling operation. By making this surface as illustrated, the tendency to crush or mutilate the vegetables is reduced to a minimum.

The shaft, intermediate of its ends and below the abrading member 13, carries a large gear 14 by means of which the shaft and abrading member are driven. The source of power which I preferably employ is an electric motor 15 supported beneath the pan. Although this motor is shown with its shaft horizontal, it is of course evident that it might be supported as shown in Fig. 14 of my prior Patent No. 942,932, with the shaft vertical, and straight gears be employed in place of the beveled gears here shown. Any suitable supporting means may be employed for the motor, but to simplify the construction, render it rigid and eliminate extra parts, I preferably provide the motor with a base portion 16 bolted directly to the under surface of the pan 10 and adjustable as hereinafter pointed out.

The mechanism shown for transmitting power from the motor to the gear wheel 14 and the means for supporting the power transmitting parts constitute one form which my present invention may assume. As shown, the pan 10 is provided with an elongated opening 17 through which extends a vertically disposed sleeve 18. The sleeve serves as a support for a vertically disposed shaft 19, which on its lower end, carries a bevel gear 20 meshing with a bevel gear 21 on the motor and at its upper end carries a pinion 22 meshing with the gear 14 of the main shaft 12. This sleeve, intermediate of its ends, is rigidly secured to the frame 10 and the securing means is such that the position of the sleeve and of the shaft carried thereby may be bodily adjusted toward and from the shaft 12. As the preferred means of supporting and securing the sleeve, I provide the latter with a flange 23 formed integral therewith and presenting a surface for engagement with the under surface of the pan 10. The flange is provided with elongated slots 24 through which bolts 25 extend to clamp the sleeve in the desired position. By machining the upper surface of the flange and the under side of the pan, a substantially water-tight joint may be secured.

The gear 14 and the pinion 22 are preferably inclosed in a gear casing including a lower section or body portion 26 and an upper section or cover portion 27 clamped together, the gear casing being preferably supported upon the hub portion 11 of the pan. For holding the sleeve rigid in respect to the gear casing, I preferably provide a collar 28 through which, or into which, the sleeve 18 may extend. This collar is adapted to be rigidly secured to the under side of the gear casing and the securing means is such as to permit an adjustment of the sleeve toward and from the main shaft 12. Substantially the same securing means may be employed as that used for holding the flange 23 to the bottom of the pan, although as shown, the collar 28 has bolt openings 29 extending through registering slots 30 in ears or lugs 31 on the two sections of the gear casing. The collar is of materially larger size than the slot in the bottom of the gear casing and the under surface of the section 26 and the upper surface of the collar 28 may be machined so as to provide a substantially water-tight seal.

By means of my improved construction, the gear ratio between the motor and the revoluble abrading element may be very readily changed by removing the pinion 22 and replacing it by a larger or smaller one and making the corresponding adjustment of the sleeve 18 and the shaft which is carried thereby. It is thus only necessary to replace one of the four gears to secure the desired result and it is not necessary to make any change in the bevel gears 20 and 21 as the motor 15 may be bodily shifted to an extent corresponding to the shifting of the sleeve so as to maintain the proper engagement of the bevel gears.

For preventing the water from entering the gear casing, the abrading member 13 is provided with a flange 33 upon the under side thereof. This flange is of annular form preferably concentric with the axis of rotation of the shaft 12 and spaced at some little distance from said shaft. The top of the gear casing is provided with an upwardly extending flange 34 spaced at some little distance from said shaft and slightly smaller in diameter than the flange 33. When the machine is running at full speed, there will be no tendency for water to flow along the under surface of the element 13, as it will be thrown out concentrically, but after the machine comes to rest, any water which might tend to flow along the under surface of said element will come to the flange 33 and will drip from the lower edge of the latter. As this edge is outside of the opening to the casing, the water will strike the top of the gear casing and will flow therefrom without entering the chamber occupied by the gears. The upturned flange 34 also preferably extends to a higher elevation than does the upper edge of the peripheral wall of the pan so that in case the machine gets stopped up and the pan filled with water, it will overflow from the pan without any of the water flowing over the edge of the flange 34 into the gear casing.

As previously stated, the construction illustrated in the drawings constitutes only one embodiment of my invention and I wish it particularly understood that I am not to be limited to the various details of construction illustrated and described except in so far as they are defined and positively claimed hereinafter.

Having thus described my invention, what I claim as new and desire to secure by Letters Patent is:

1. A vegetable paring machine having a rotary vegetable supporting member presenting an abradant upper surface, formed of alternate radially extending elevations and depressions merging together to form a wavy curved surface.

2. A vegetable paring machine having a rotary vegetable supporting member presenting an abradant upper surface, formed of alternate elevations and depressions merging together to form a wavy curved surface and having the peripheral portion thereof curved upwardly to form a continuous peripheral wavy lip or flange.

3. A vegetable paring machine having a rotary vegetable supporting member presenting an abradant upper surface, formed of alternate elevations and depressions merging together to form a wavy curved surface terminating at its outer edge in a continuous peripheral upturned lip.

4. An abradant element for peeling machines comprising a vegetable supporting disk having a central hub portion and upwardly turned peripheral portion, and an intermediate body portion formed of successive radially disposed elevations and depressions merging into each other and each presenting a curved surface.

5. An abradant element for peeling machines comprising a vegetable supporting disk having a central hub portion and upwardly turned peripheral portion, and an intermediate body portion formed of successive radially disposed elevations and depressions merging into each other and each presenting a curved surface and no two adjacent surface elements being inclined to the same extent in respect to the axis of rotation.

Signed at New York city in the county of New York and State of New York this 31st day of December A. D. 1914.

HENRY ROBINSON.

Witnesses:
 HARRY DAVIDSON,
 CHAS. J. SCHEIB.